United States Patent [19]

Heather

[11] 3,739,086

[45] June 12, 1973

[54] FRAME ADDRESSING SCHEME FOR VIDEO RECORDING MEDIUM

[75] Inventor: John T. Heather, Sunnyvale, Calif.

[73] Assignee: Ampex Corporation, Redwood City, Calif.

[22] Filed: Oct. 27, 1969

[21] Appl. No.: 870,680

[52] U.S. Cl. 178/6.6 A, 179/100.2 B, 179/100.2 S, 340/174.1 C, 340/174.1 J

[51] Int. Cl...... G11b 5/06, G11b 23/42, H04n 5/78

[58] Field of Search.............. 340/174.1 J, 174.1 K, 340/174.1 G, 174.1 H, 174.1 C; 179/100.2 B, 100.2 S

[56] References Cited

UNITED STATES PATENTS

| | | | |
|---|---|---|---|
| 3,180,930 | 4/1965 | Bounsall | 179/100.2 B |
| 3,342,932 | 9/1967 | Bounsall | 179/100.2 B |
| 3,108,261 | 10/1963 | Miller | 340/174.1 |
| 3,382,492 | 5/1968 | Santana | 340/174.1 |
| 3,493,962 | 2/1970 | Vallee | 340/347 |

*Primary Examiner*—Howard W. Britton
*Assistant Examiner*—Donald E. Stout
*Attorney*—Robert G. Clay

[57] ABSTRACT

Consecutive frames of a magnetic video tape are addressed consecutively by unique frame identifying signals carrying information recorded in a self-clocking NRZ format along a separate cue track of the tape as sequences of magnetic flux transitions between different magnetic states at discrete intervals. Each unique frame identifying signal includes a block control information recorded as one sequence of magnetic flux transitions along first lengths of the track and a block unique address signal information recorded as a different sequence of magnetic flux transitions along second lengths of the track alternating with the first lengths. The unique address signal information sequence of each unique frame identifying signal is different, carrying address information identifying one particular frame. The control information sequences of all of the unique frame identifying signals are identical and are recorded exclusively along the first lengths of the cue track. Each control information sequence includes a first sequence of magnetic flux transitions in a boundary segment at each end of the first length and a second sequence of magnetic flux transitions in a segment of the first length interjacent the boundary segments. A magnetic flux transition occurring in each second sequence a selected number of transitions from the first sequences is from the same one of the different magnetic states to the other of the magnetic states in all of the first lengths of the track. Decoding means is responsive to the flux transitions forming the control information sequences to provide tape speed, tape transport direction and clock rate information used to decode the reproduced address signal information.

16 Claims, 6 Drawing Figures

INVENTOR.
JOHN T. HEATHER

BY Robert G. Clay

ATTORNEY

INVENTOR.
JOHN T. HEATHER

BY Robert G. Clay

ATTORNEY

FRAME ADDRESSING SCHEME FOR VIDEO RECORDING MEDIUM

FIELD OF INVENTION

The present invention relates to storing data information along a single track of a magnetic record medium. More particularly, it relates to storing data information with unique control information in a self-clocking non-return-to-zero format whereby the date information can be reproduced from the magnetic record medium as it is transported at various speeds and as it is transported in either the forward or reverse directions.

BACKGROUND OF THE INVENTION

Heretofore, in editing of television program material recorded on magnetic record media, such as magnetic tapes, it has been necessary to rely heavily on trial and error for the achievement of a precise edit, with emphasis on the editor's skill in operating the editing equipment. The necessity of human intervention in the editing process has resulted from the inability of electronic editing and associated equipment, such as described in U.S. Pat. Nos. 3,084,215 and 3,180,930, to initiate editing functions automatically at a precise frame location on the magnetic tape. The inability to initiate editing functions at a precise frame location has been due principally to not being able to identify each of the frames nor keep track of their relative positions as the magnetic tape is transported at the different speeds encountered during the performance of the editing functions.

It is known to provide address signals on magnetic tapes to identify their discrete storage address locations. The address signals generally are recorded in a binary notation. However, the magnetic tape standards set for the television broadcasting industry and the requirements dictated by the editing process impose several conditions on recording address information which can not be satisfactorily met by commonly known binary recording techniques. Such techniques have not been suitable for addressing the storage address locations or frames of magnetic tape used to record television information because only one track is available for recording address information on the tape and the address information must be reproducible from the tape at several different transport speeds.

More specifically, the standard magnetic tape used to record television program material, or video tape, is about two inches wide and has a video track portion with an audio track portion along one edge and adjacent control track and cue track portions along it's other edge. The audio and control tracks have designated uses and are not available for addressing purposes. The cue track is a spare track provided for the discretionary use by the user. Hence, the address information identifying the frames must be recorded on the single cue track of the standard video tape.

In addition, when performing a series of editing functions, often the magnetic tape must be transported to position different widely separated frames of the tape for successive access by the magnetic transducing mechanism or head. During the performance of the transducing operations, i.e., recording or reproducing, the tape speed is relatively slow, e.g., five to fifteen inches per second (ips). However, when transporting or shuttling the tape to position a frame for access by a magnetic head which is widely separated from the frame previously positioned for access by the head, it is desirable and, as a practical matter, essential to transport the tape at much higher speeds, usually in the range of three hundred ips to one thousand ips. In order to control precisely the positioning of selected frames of the tape, it is essential that the address signals identifying the frames of the magnetic tape be reproducible from the tape as the tape speed is changed between the transducing and shuttling speeds.

To recover address information or any data recorded on a single track of a magnetic record medium employed in data processing equipment, the recorded information must contain clock or timing information as well as the data or address information. In situations where the recorded information is reproduced from a magnetic record medium while it is being transported at a single well known speed, self-clocking non-return-to-zero (NRZ) format recording techniques have been satisfactory for processing information recorded in a binary notation.

In a self-clocking NRZ format, the recorded information contains clock information and data information. The recorded information is stored in a track of the magnetic record medium by continuously magnetizing the medium in one direction or in the opposite direction, with the direction of the magnetic flux or state of magnetization being repeatedly reversed at discrete intervals along the track in accordance with the data and the clock information recorded. Self-clocking NRZ formats include continuous self-clocking formats and semi-self-clocking formats. In continuous self- clocking formats, clock or timing information is recorded as as flux transitions at periodic intervals along the track at the clock signal rate which controls the encoding of the data information. In semi-self-clocking formats, there is some maximum interval between flux transitions. The maximum interval between flux transitions is a multiple of the clock signal period. In each of these self-clocking NRZ formats, additional flux transitions will be recorded in accordance with encoded data information between the clock period related flux transitions.

Systems for recording data information in self-clocking NRZ formats along a single track of a magnetic tape are described in the U.S. Pat. Nos. 3,108,261, 3,382,492 and 3,427,605. To decode the self-clocking NRZ recorded information and obtain data information therefrom, the clock information must be extracted from the recorded information. Furthermore, when reproducing blocks of information serially recorded along a track, the boundary separating adjacently recorded blocks of information must be identified. In addition, when recorded information is reproduced from the tape as the speed at which it is transported changes over a wide range, such as an order of magnitude or more, and as it is transported in either forward or reverse directions, it is necessary to know the direction in which the tape is being transported and the speed at which the tape is being transported during reproducing operations. In prior art continuous self-clocking NRZ recording systems, such as described in the aforementioned U.S. Pat. Nos. 3,382,492 and 3,427,605, the tape is transported at a known speed and in a known direction during reproducing operations. The tape is transported at known speed because of the presence of magnetic flux transitions between, generally, intermediate, the periodically occuring clock interval transitions. The presence of these intermediate flux transitions results in a recorded clock interval transition followed by a recorded intermediate flux transition being confused with consecutively recorded clock interval flux transitions if the tape's speed is unknown. Such confusions cause an erroneous reproduction of clock information. Without correct clock information, it is not possible to recover the recorded data information. To overcome this problem and enable reproducing operation to be conducted at various record medium speeds, it has been the practice to record a timing signal along a separate track in a time synchronized relation with the self-clocked NRZ recorded information. As described hereinbefore, television video tapes do not have an additional track available for recording such a timing signal.

A record medium carrying information in a self-clocking NRZ format is commonly transported in a known direction during reproducing operations so that the flux transition sequence can be reliably decoded. When reproducing the recorded information as the record medium is transported in a direction opposite that in which it was transported during recording, the recorded information will be reproduced backwards and, in some self-clocking NRZ formats, the information represented by the flux transitions changed. Since the self-clocked NRZ recorded information does not include transport direction information, such formats have not been suitable for recording information that is to be reproduced while the direction of transportation of the record medium is randomly changed between forward and reverse directions.

When information is recorded in a semi-self-clocking NRZ format, such as described in the aforementioned U.S. Pat. No. 3,108,261, it is possible to faithfully reproduce the recorded information as the record medium's speed changes a small percent. The amount of allowable change is determined by the minimum distance between adjacent flux transitions, hence, the clock signal rate. However, information recorded in such formats has not been reproducible when the record medium's speed has been varied over wide ranges such as an order of magnitude or more. It has not been possible to reproduce information recorded in such formats over wide ranges of record medium speeds because lesser spaced flux transitions are confused with greater spaced flux transitions when the speed of the record medium is changed. Furthermore, as in the case of recording information in a continuous self-clocked NRZ format, when reproducing information recorded in a semi-self-clocked NRZ format, the record medium is commonly transported in a known direction.

Hence, self-clocking NRZ recording techniques have not been suitable for use in recording address signals on video tapes, nor any data information which are to be recorded along a single track of a magnetic record medium for subsequent reproduction at several possible transport speeds and as the record medium is transported in either of the forward or reverse directions.

When recording address signals to identify the storage addresses or frames of the magnetic record medium, it is desirable the address signals also provide information from which can be determined the number of storage addresses separating any particular storage addresses on the record medium. Such address signals can be used to control the transportation of the record medium to position a particular one of its storage addresses at a selected location, for example, for access by a transducing magnetic head. In addition, automatic electronic editing of video tape would be greatly facilitated by providing an address signal on magnetic video tapes which is in a language that is compatible with the language of the system used throughout the television broadcasting industry to identify segments of live television program material. The television broadcasting industry uses a time code in hours, minutes, seconds and frames to identify each frame of live television program material as it is generated.

Therefore, considerable advantage is to be gained by recording information in a self-clocking NRZ format along a single track of a magnetic record medium which can be reproduced as the record medium is transported at various speeds and as it is transported in either the forward or reverse directions. Additional advantages are to be gained by prerecording along a single track of a video record medium a unique address single for each of it's frames in a self-clocking NRZ format from which the actual location of any frame relative to the other frames on the record medium can be determined at any record medium speed.

SUMMARY OF THE INVENTION

Accordingly, it is an object of the present invention to record information in a self-clocking NRZ format along a single track of a magnetic record medium which can be reproduced at any speed the record medium is transported.

More particularly, it is an object of the present invention to record data information along a single track of a magnetic record medium in a self-clocking NRZ format with unique control information which enable the data information to be reproduced from the record medium at any speed it is transported.

Furthermore, it is an object of the present invention to prerecord in a self-clocking NRZ format along a single track of a magnetic video record medium a unique address signal for each frame carrying information which identifies the location of the frame on the record medium and which can be reproduced from the record medium at any speed it is transported.

Another object of the present invention is to prerecord such address signals in a time code which is compatible with the code used in the television broadcasting industry to address each frame of live television program material generated.

A further object of the present invention is to prerecord in a self-clocking NRZ format along a single track of a video record medium to be transported in opposite directions past a reproduce transducing means a unique address signal for each frame which carries information identifying the location of the frame on the record medium and which can be reproduced as the record medium in transported at various speeds and as it is transported in either the forward or reverse directions.

Yet another object of the present invention is to prerecord in a self-clocking NRZ format along a single track of a video tape a unique frame identifying signal for each frame which carries information identifying the location of the frame on the video tape and the junction of adjacent frames and which can be reproduced at any tape transport speed.

It is still another object of the present invention to prerecord such address signals in a code which facilitates automatic electronic editing of television program material involving the transfer of television program material between different video tapes, live television program material source and video tapes, and any television program material source and video tapes.

In accordance with the present invention, a magnetic record medium has a track of alternating first and second lengths with each first length including a boundary segment at each of its ends and an interjacent segment. Binary control information is recorded along the first lengths of the track and binary data information is recorded along the second lengths of the track. The binary data and control information are recorded on the record medium in a self-clocking NRZ format as sequences of magnetic flux transitions occurring at discrete intervals between different states of magnetization. Each sequence of control information is identical and includes a first sequence of flux transitions along each boundary segment and a second sequence of flux transitions along the interjacent segment of the first length of the track. The first sequence of flux transitions defines the boundary of the recorded control information occurs only along the first lengths of the track and are employed during reproducing operations to activate means for reproducing and decoding the control information of the second sequences in the interjacent segments. Since the sequence of flux transitions forming the control information along each first length of the track is identical and does not appear along the record medium's track in which data information is recorded, the block of control information can be detected and reproduced at any speed the record medium might be transported. Furthermore, since the sequence of flux transition forming the control information is unique to the first lengths, timing or clock information can be extracted from the control information at any record medium speed.

To enable the determination of the direction of transport of the record medium at any speed, the second sequence along each first length of the track has a magnetic flux transition condition at a location which is a selected number of intervals from the first sequences, or each of the boundaries of the first length along the track of the record medium. Hence, as the record medium is transported in opposite directions relative to a reproduce magnetic transducer, the flux transition condition of each of the second sequences will provide different reproduce signals according to the direction the record medium is transported. By detecting the different reproduce signals, the direction of transport of the record medium can be determined as each control information block passes the reproduce magnetic transducer.

An additional feature of the data information storage scheme of the present invention is the recording format employed for recording address data information along a single track of a video record medium which identifies each frame of the video record medium. Address data information is recorded as hours, minutes, seconds and frames. Identifying each frame consecutively in this recording format facilitates automatic electronic editing since it is possible to relate any frame of a video record medium directly to, for example, the time at which a particular frame of live television program material is going to be generated.

BRIEF DESCRIPTION OF THE DRAWINGS

The foregoing and other advantages and features of the present invention will become apparent from the following description and claims considered together with the accompanying drawings of which:

DESCRIPTION OF THE PREFERRED EMBODIMENT

Figures 1A, 1B, 2, 3:
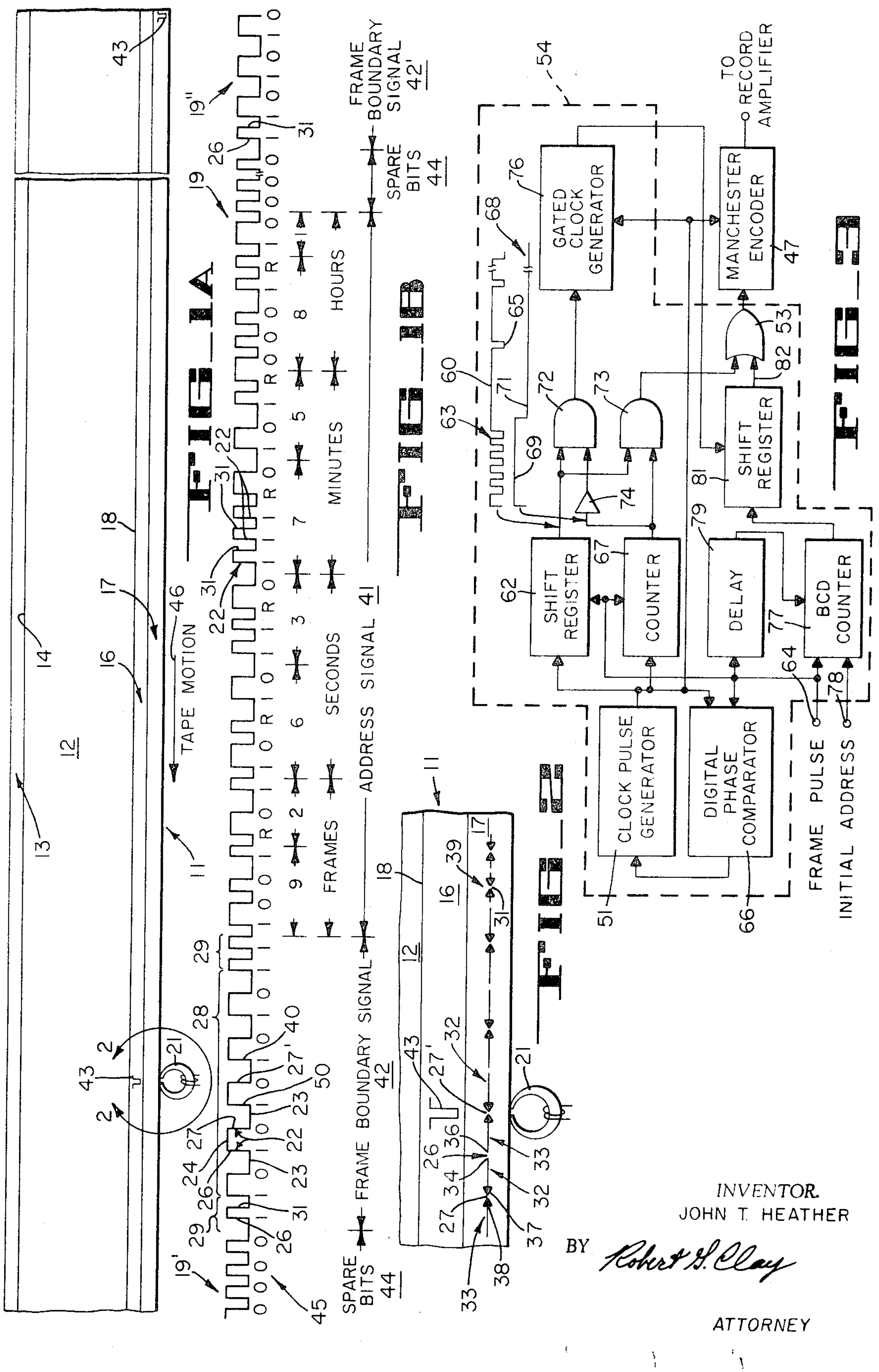
FIG. 1A is plan view of a broken segment of a longitudinally enlarged length of magnetic video tape within which a frame identifying signal is recorded.
FIG. 1B is an electrical analog of a frame identifying signal recorded on the length of magnetic video tape of FIG. 1A.
FIG. 2 is a segment of the magnetic video tape of FIG. 1A delineated by line 2—2 portraying the states of magnetization on the tape carrying the information of a portion of the frame identifying signal.
FIG. 3 is a schematic block diagram of an embodiment of a system for encoding the frame identifying signals for recording on the magnetic video tape in a Manchester II + 180° self-clocking NRZ format.

The storage of data information along a track of a magnetic record medium in accordance with the present invention will be described as employed to record signals identifying the frames of a magnetic video tape. Referring to FIGS. 1 and 2, a segment of a magnetic tape type video record medium 11 employed in the television broadcasting industry is illustrated. The magnetic video tape 11 has a video track portion 12 for recording frames of television program material. An audio track portion 13 longitudinally extends along one edge 14 of the video track 12. Adjacent control track 16 and cue track 17 longitudinally coextend along the other edge 18 of the video track 12. As described hereinbefore, the audio and control tracks 13 and 16 have designated uses and, hence, are not available for addressing purposes.

Information identifying the frames of the magnetic video tape 11 is recorded on the cue track 17 as a binary frame identifying signal 19 by a record and reproduce magnetic head 21. A unique frame identifying signal 19 is recorded for each frame of the magnetic video tape 11 to identify the location of the frame on the tape 11 relative to the other frames. In the illustrated embodiment, the frame identifying signals 19 are recorded on the cue track 17 in the Manchester II + 180° type self-clocking NRZ format, with each frame identifying signal 19 recorded as a unique sequence of binary bits. FIG. 1B illustrates the electrical analog of the magnetic flux pattern of a frame identifying signal 19 recorded on the cue track 17 in the Manchester II + 180° format. In this format, magnetic flux transitions 22 occur at discrete intervals between different states of magnetization 23 and 24 at a predetermined clock rate. These magnetic flux transitions which occur at the "clock rate" carry the frame identifying signal information and are identified in FIG. 1B by the reference numbers "1" and "0," and by the reference letter "R." In the illustrated embodiment, the flux transitions occur between opposite polarity states of magnetization with a positive magnetic flux transition 26, i.e., one from a negative state of magnetization 23 to a positive state of magnetization 24, at "clock time" representing the binary bit "one." A negative magnetic flux transition 27 at "clock time" represents the binary bit "zero." The "clock rate" is the repetition rate of clock pulses forming a train of uniformly spaced pulses which controls the encoding of the information into the Manchester II + 180° format. "Clock time" is the instant that the information carrying magnetic flux transition occurs. As long as the sequence of bits representing the frame identifying signal 19 alternates between "one" and "zero" bits, for example, as occurs along the length of the cue track 17 having the sequence spanned by bracket 28, alternating positive and negative magnetic flux transitions 26 and 27 will occur along the length of the cue track 17 at "clock times." However, if a series of consecutive "one" bits or a series of consecutive "zero" bits occur in the sequence of bits representing the frame identifying signal 19, for example, as occurs along the length of the cue track 17 having the sequence spanned by bracket 29, a non-information carrying magnetic flux transition 31 occurs between clock time transitions 22.

In FIG. 2, the states of magnetization appearing on the cue track 17 of a segment of the magnetic video tape 11 of FIG. 1A having the address signal 19 of FIG. 1B recorded thereon is portrayed by oppositely directed arrows 32 and 33. The arrows 32 portray the recording of negative states of magnetization 23 while the arrows 33 portray the recording of positive states of magnetization 24. Adjacent arrows 32 and 33, which have their tail ends 34 and 36 abutting, portray the positive magnetic flux transition 26. Adjacent arrows 32 and 33, which have their arrow heads 37 and 38 abutting, portray the negative magnetic flux transition 27. Arrows of two different lengths appear in FIG. 2. The longer arrows portray magnetic flux transitions occurring at the clock rate as occurs during a sequence of alternating "one" and "zero" bits. Pairs of the shorter arrows, such as at 39, portray the recording of a non-information carrying magnetic flux transition 31 as occurs during the recording of a series of consecutive "one" or consecutive "zero" bits.

While a Manchester II + 180° self-clocking NRZ format is chosen to illustrate the storage of data information along a track of a magnetic record medium in accordance with the present invention, other continuous and semi-self-clocking NRZ formats can be employed to record the data information. In other self-clocking NRZ formats, the sequence of flux transitions representing recorded data information may be different. However, in each of these formats, the recorded information is stored by continuously magnetizing the record medium in different states of magnetization with the state of magnetization being repeatedly changed (flux transitions) in accordance with the data and clock information being recorded. Although the different self-clocking NRZ formats will require changes in the details of the particular logic circuits employed to encode and decode the data information that is recorded along the magnetic record medium's track the manner in which the data information is reproduced from the record medium 11 at various speeds and directions of transport conceptually remains unchanged.

Considering the addressing scheme of the present invention in detail, each information block or frame identifying signal 19 includes a data information or address signal portion 41 and a control information or frame boundary signal portion 42. The frame boundary signals 42 of all of the frame identifying signals 19 are identical and are recorded as a selected sequence of magnetic flux transitions representative of a selected sequence of binary bits, with the sequence occurring exclusively in the frame boundary signal portion 42 of the cue track 17. To aid in detecting the location of the boundary between adjacent frames in the video track 12, the recorded sequence is aligned with a frame pulse 43 recorded in the control track 16.

Each frame boundary signal 42 includes two sequences 29 of magnetic flux transitions recorded along segments at the boundaries of the length of the cue track 17 provided for a frame boundary signal 42. A contiguous interjacent sequence 28 of magnetic flux transition bearing control information is recorded along a segment of the length of the cue track 17 interjacent the boundary segments. In the illustrated embodiment, each of the boundary portions 29 includes a positive flux transition 26 at clock time followed by an intermediate negative non-information carrying flux transition 31. As will be described hereinbelow, the transitions of the boundary sequences 29 activate means for reproducing decoding the interjacent control information bearing flux transition sequence 28. To enable the determination of tape speed and of the direction of tape motion as well as the boundaries of the frames and "clock rate" the frame boundary signal 42 is selected to include a sequence of magnetic flux transitions representing an odd number of binary bits. Furthermore, a flux transition 27' occurring in one interval of the frame boundary signal sequence 42 at a location which is a selected number of flux transitions from the boundary flux transition sequences 29, or the ends of the selected frame boundary signal sequence 42, is caused to occur in each of the frame boundary signal sequences 42 from the same one of the magnetic states 23 or 24 to the other of the magnetic states, i.e., always positive or negative. In the illustrated embodiment, a sequence of thirteen binary bits in a code of 1101010101011 is selected to be recorded along the cue track 17 as the frame boundary signals 42. The nine intermediate alternating "ones" and "zeros" form the selected interjacent sequence 28 bearing the control information. The binary bit sequence 01010 is set as the exclusive sequence from which the clock rate, tape speed, direction of tape motion and location of the frame boundary is determined. The sequence of nine intermediate binary bits is chosen to be symmetrical about the selected number flux transition 27'. Hence, proceeding through the intermediate nine bit sequence from either of the frame boundary flux transition sequences 29 identifying the opposite ends of one frame boundary signal sequence 42, a sub-sequence of four binary bits, i.e., 0101, is followed by a subsequence of one binary bit, i.e., 0, to form the five binary bit exclusive sequence 01010 occurs with the fifth or last binary bit of the exclusive sequence being the selected number flux transition 27'.

In the Manchester II + 180° self-clocking NRZ format, a binary bit sequence of alternating "ones" and "zeros" is recorded as flux transitions occurring at clock rate. Since the exclusive sequence only appears in the frame boundary signal portion 42 of the cue track 17, decoding means can be provided which is responsive only to the reproduction of the five binary bit exclusive sequence. The possibility of confusing a sequence of five flux transitions representing three consecutive identical binary bits, for example, as occurs in recording the four zero binary bits at 45, with the sequence of five flux transitions representing the exclusive sequence is prevented by the presence of the two consecutive "one" binary bits forming the boundary sequences 29 of the frame boundary signal 42. Since in the Manchester II + 180° self-clocking NRZ format transitions will occur at clock rate or twice clock rate and the frame boundary signal sequence 42 includes identifiable flux transitions occurring at both of these rates, it is possible to discriminate between a sequence of transitions at twice clock rate, such as occurs at 45, from a sequence of like number of transitions at clock rate and to detect the presence of the frame boundary signal 42. This enables clock to be extracted at any speed the video tape 11 might be transported during reproducing operations. By being able to detect the recorded clock pulses, it is possible to determine the speed at which the video tape 11 is being transported by, for example, comparing the rate at which the bits forming the sequence 28 of the frame boundary signals 42 are reproduced to a known reference representative of a selected nominal speed. Furthermore, this also enables the decoding means to be set to reproduce the data information or frame address signal 41.

The odd number of flux transitions forming the sequence identifying the frame boundary signal 42 and the ability to identify the flux transition 27' occurring in the exclusive sequence at a location which is a selected number of flux transitions from the boundary flux transition sequences 29 enables the detection of the direction of tape motion. The direction of the motion of the magnetic video tape 11 is determined by taking advantage of the reversal of polarity of the magnetic flux transitions when the direction of the tape motion is reversed. Referring to the magnetic flux transition corresponding to the "zero" bit 27' as illustrated in FIG. 2, as the magnetic video tape 11 is transported in the, for example, forward direction indicated by the tape motion arrow 46 in FIG. 1A, the magnetic flux transition corresponding to the "zero" bit 27' appears as a negative flux transition from the positive state of magnetization 24 to the negative state of magnetization 23. However, when the tape 11 is transported in the reverse direction, the same magnetic flux transition appears as a positive flux transition from the negative state of magnetization 23 to the positive state of magnetization 24. Hence, the polarity of the magnetic flux transition corresponding to the selected number "zero" bit 27' indicates the direction of the motion of the magnetic video tape 11. As will be explained hereinbelow, this indication is employed to control the decoder so that the frame address signal 41 can be decoded regardless of the direction of tape motion.

The sequence of binary bits selected as the frame boundary signal sequence 42 and sequence of binary bits selected as the exclusive sequence depends largely on the particular binary code and self-clocking NRZ format selected to record the data information or address signal 41. While a sequence of thirteen bits has been described as forming the frame boundary signal sequence 42, sequences of different numbers of bits can also be conveniently employed. Furthermore, it is not necessary to select an information bearing sequence which is symmetrical about the selected number flux transition 27' so that the same flux transition interval is examined to determine the direction of tape motion as the video tape 11 is transported in both directions. As long as the selected number flux transition appearing at different locations in the frame boundary signal sequence is in the same direction, it is possible to detect the direction of tape motion. For example, if the seventh flux transition from the boundary sequences 29 is used to indicate the direction of tape motion, flux transitions 40 and 50 would provide the tape direction information. When the video tape 11 is transported in the forward direction, as represented by arrow 46, the seventh flux transition 40 from the boundary sequence 29 at the left of the frame boundary signal 42 appears as a positive transition and would be employed by the decoding means to indicate a forward direction of tape transport. When the video tape 11 is transported in the reverse direction, the seventh flux transition 50 from the right boundary sequence 29 appears as a negative transition and would be employed by the decoding means to indicate a reverse direction of tape transport.

To facilitate automatic electronic editing of video tape, the address signals 41 preferably are recorded in the cue track 17 in a language which is compatible with the language customarily used in the television broadcasting industry to identify segments of live program material. In the embodiment illustrated by FIGS. 1 and 2, the address signals 41 are recorded in lengths of the cue track 17 between successive frame boundary signals 42 as a time code of hours, minutes, seconds and frames in a binary coded decimal (BCD) type of binary notation where each decimal place of the four segments of the time code is converted to be represented by a binary number. A truncated form of the usual BCD format of four bits per numeral is used to take advantage of the limited number of different numerals which occupy some of the decimal places in the presentation of hours, minutes, seconds and frames. For a time code capacity of 24 hours, each address signal 41 includes 26 bits. Two bits are used for tens of hours and four bits for units of hours. Three bits are used for tens of minutes and four bits for units of minutes. Three bits are used for tens of seconds and four bits for units of seconds. Since in the various television systems there are either 25 or 30 frames generated per second, two bits are used for tens of frames and four bits for units of frames.

While the frame boundary signals 42 associated with all of the frame identifying signals 19 are identical, unique consecutive time codes of a sequence of the time code are used to record the address signals 41 identifying consecutive frames of the magnetic video tape 11. In FIGS. 1A and 1B, an address signal sequence of magnetic flux transitions 41 is recorded which carries an address of eighteen hours, fifty-seven minutes, 36 seconds and 29 frames. The frame identifying signal flux sequences 19' and 19'' immediately proceeding and following the frame identifying signal 19 respectively carry an address of 18 hours, 57 minutes, 36 seconds and 28 frames and an address of 18 hours, 57 minutes, 37 seconds and 0 frames.

In the illustrated embodiment, the occurrence of an exclusive sequence of five alternating "one" and "zero" bits, i.e., 01010, is prevented from appearing in the address signal sequence 41, hence, the generation of a false frame boundary and tape motion information by an address signal sequence inhibited, by repeating every fourth address bit. In FIG. 1B, the repeated bits are designated by the reference letter "R." Furthermore, if the address signal sequence 41 and frame boundary signal sequence 42 are recorded on the cue track 17 in a space smaller than that available for addressing the frames whereby a spare bit interval 44 exists, every fourth bit recorded in the spare bit interval 44 would be repeated. In one embodiment, a code group for each frame was selected which consisted of seventy-eight clock intervals. This required a 2.34 KHz train of clock pulses to encode the frame identifying signals 19 onto for recording along the cue track 17. Thirteen of the clock intervals were used to record the frame boundary signal sequence 42, 26 were used to record the address signal sequence 41, 26 of the clock intervals were available as spare-bit intervals for recording other information, such as a second address signal sequence, and the remaining 13 clock intervals were scattered at regular intervals throughout the address signal and spare-bit interval lengths of cue track 17 of each of the frame identifying signals 19 as repeat bits at spaced locations of five intervals.

Figure 4:
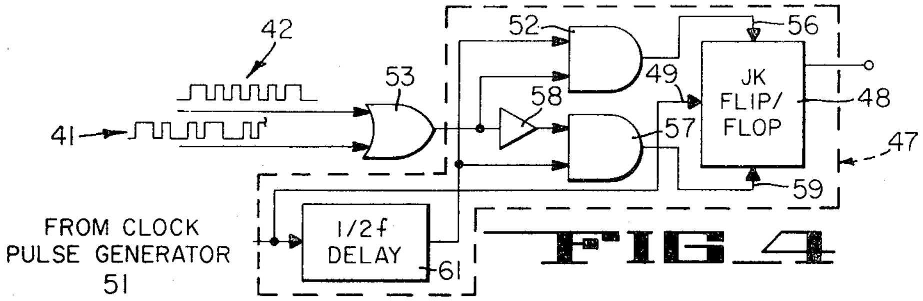
FIG. 4 is a logic block diagram of the Manchester encoder of FIG. 3.

With reference to FIGS. 3 and 4, an embodiment of the system for encoding the frame identifying signal information onto for recording along the cue track 17 in the Manchester II + 180° self-clocking NRZ format is illustrated. The frame identifying signal 19 as, for example, illustrated in FIG. 1B, to be recorded on the cue track 17 is provided by a common Manchester encoder 47 to a common digital record amplifier (not shown) for processing prior to coupling to the magnetic head 21. An example of a common Manchester encoder 47 is shown in FIG. 4 and includes a J–K type flip-flop 48 having its clock input 49 coupled to receive the clock pulses provided by a clock pulse generator 51 (see FIG. 3). A first steering AND gate 52 couples the frame identifying signal information to be encoded in the Manchester II + 180° format received at one of its inputs from an OR gate 53 of a frame identifying signal generator 54 (see FIG. 3) to the direct set input 56 of the J–K flip-flop 48. A second steering AND gate 57 receives at one of its inputs an inverted form of the frame identifying signal information to be encoded from an inverting amplifier 58 coupled to the OR gate 53. The second steering AND gate 57 couples the frame identifying information to the direct reset input 59 of the J–K flip-flop 48. A delay circuit 61 couples the clock pulses provided by the clock pulse generator 51 to the other input of each of the steering AND gates 52 and 57 and introduces a delay equal to $t/2$, where $t$ is the period of one cycle of the clock pulse frequence.

As will be described in further detail hereinbelow, the frame identifying signal information provided by the generator 54 at the input to the Manchester encoder 47 is in the form of a sequence of high and low signal levels. For example, the thirteen bit sequence identifying the frame boundary signal 42 of the frame identifying signals 19 is shown in FIG. 4 at one of the inputs to the OR gate 53 in signal level form. In this form, the 1101010101011 sequence of binary bits appears as a signal having a sequence of levels consisting of a high signal level for two clock intervals, followed by alternating low and high single clock interval signal levels for nine clock intervals and ending in a high signal level for two clock intervals. The various address signal 41 of the frame identifying signals 19 to be encoded appear in the same form at the other input of the OR gate 53 in a time synchronized relationship with the frame boundary signal 42. The J–K flip-flop 48 together with the two steering AND gates 52 and 57 and the delay circuit 61 operate on the level form of the frame identifying signal 19 in the well known manner to convert it to the desired Manchester II + 180° transition form of the signal illustrated in FIG. 1B in preparation to recording it on the cue track 17 of the magnetic video tape 11.

Considering the frame identifying signal information generator 54 illustrated in FIG. 3, binaries of a chain forming a setable shift register 62 are arranged to be set into states to provide a selected binary control signal 63 which controls the generation of the frame identifying signals 19. For the particular embodiment illustrated, the binary control signal 63 begins with a sequence of signal levels corresponding to the thirteen binary bits forming the frame boundary signal 42. The thirteen binary bit sequence is followed by a sequence of the binary number 11110 repeated 13 times. In signal level form, the binary control signal 63 starts with a high signal level for two clock intervals. A sequence of nine alternating low and high signal levels follow the initial high signal level portion, with each of the alternating levels lasting a single clock interval. The nine clock interval signal level sequence is followed by a high signal level for two clock intervals. The foregoing high signal level portions and interjacent nine clock interval signal level sequence form the initial thirteen binary bit sequence of the binary control signal 63. The sequence of the repeating binary number 11110 following the initial 13 binary bit sequence is formed by a sequence of 26 alternating high and low signal levels 60 and 65, with each high signal level 60 lasting four clock intervals and each low signal level 65 lasting a single clock interval. The binary control signal 63 is set into the setable shift register 62 each time a frame pulse is received at terminal 64 from a master frame pulse signal generator (not shown) used by the television broadcasters to record frame pulses 43 on the control track 16 of a magnetic video tape. The setable shift register 62 stores the binary control signal 63 in the form of the aforedescribed sequence of high and low signal levels. The binary number forming the control signal 63 set into the setable shift register 62 is serially output therefrom at the clock rate determined by clock pulses provided to the register by the clock pulse generator 51. For the embodiment described hereinbefore wherein 78 bit intervals are provided for each frame of the magnetic video tape 11, the clock pulse generator 51 is adjusted to have a clock rate of 2.34 KHz. However, if the spare bit interval 44 were eliminated, the clock rate could be reduced to 1.56 KHz. Of course, if the capacity of the frame identifying signal 19 was reduced it would be possible to reduce further the clock rate. To maintain the proper position synchronization between the frame pulse 43 appearing on the control track 16 of the magnetic video tape 11 and the recorded frame identifying signals 19, the clock pulse generator 51 is sychronized by a common digital phase comparator 66 to the master frame pulse signal input at terminal 64.

To control the coupling of the frame boundary signal portion of the binary control signal 63 and the address signal information to the Manchester encoder 47, a resetable binary counter 67 is provided. The counter 67 counts clock pulses received from the clock pulse generator 51 and issues a control signal 68 which is at a high level 69 for thirteen clock pulse intervals and at a low level 71 for the remaining frame identifying signal interval or 65 clock pulse intervals. The output of the counter 67 is coupled to one of the inputs of each of two AND gates 72 and 73. The other of the inputs of each of the AND gates 72 and 73 are connected to receive the binary control signal 63 from the shift register 62. An inverting amplifier 74 is serially connected between the output of the counter 67 and the input to the AND gate 72. The AND gates 72 and 73 are arranged to pass the binary control signal 63 when the level of the control signal 68 is high at their inputs. Hence, during the high level portion 69 of the control signal 68, the AND gate 73 is conditioned to pass the binary control signal 63 to the input of the OR gate 53. As explained hereinbefore with reference to FIG. 4, the OR gate 53 passes the portion of the binary control signal 63 coincident with the high level 69 of the control signal 68 to the Manchester encoder 47 which converts this level form portion of the binary control signal 63 to the Manchester II + 180° transition form which is issued to the magnetic record head 21 for recording along the cue track 17 as the frame boundary signal 42.

The AND gate 72 is prevented from passing the binary control signal 63 during the high level portion 69 of the control signal 68 because of the presence of the inverting amplifier 74. The inverting amplifier 74 causes the level of the signal at the input of the AND gate 72 connected to the counter 67 to be low during the high level portion 69 of the control signal 68. This low level conditions the AND gate 72 to prevent the passage of the binary control signal 63 to a gated clock generator 76 of the frame identifying signal generator 54.

The fourteenth clock pulse received by the counter 67 sets the control signal 68 issued thereby to the low level 71. The low level 71 of the control signal 68 conditions the AND gate 73 to prevent the passage of the binary control signal 63. However, because of the operation of the inverting amplifier 74, a high level signal is present at the input of AND gate 72. This high level signal conditions the AND gate 72 to allow the passage of the binary control signal 63 to the gated clock generator 76.

The gated clock generator 76 controls the generation of the address signal 41 in level form which is coupled by the OR gate 53 to the Manchester encoder 47 for conversion to standard Manchester II + 180° transition form. For automatic encoding of the address signal 41, a BCD counter 77 is provided which stores the address signal 41 in signal level form as a BCD binary notation. The first frame address signal is input to the BCD counter 77 at a set input terminal 78. The BCD counter 77 also is connected to the frame pulse input terminal 64 to receive the frame pulse generated by the master frame pulse signal generator. Each frame pulse received advances the count stored in the BCD counter 77 one count. After the count is set in the BCD counter 77, a delayed frame pulse received from a delay means 79 issues a transfer command which instructs the BCD counter 77 to transfer the stored address signal count to a shift register 81. The delay of the delay means 79 is adjusted so that the transfer command is issued after the frame pulse and during the initial thirteen bit interval of the binary control signal 63. The shift register 81 stores the address signal in the form of a sequence of high and low signal levels. The level form of the address signal is serially output therefrom by shift commands received from the gated clock generator 76.

The shift commands issued by the gated clock generator 76 is obtained by gating clock pulses issued by the clock pulse generator 51 to the shift register 81. Each clock pulse received by the shift register 81 causes it to output the signal level corresponding to a binary bit of the stored address signal, with consecutive clock pulses causing the sequential output of the stored consecutive binary bit signal levels forming the address signal. The clock pulses are gated to pass to the shift register 81 by the sequence of the binary control signal 63 formed by repeating the binary number 11110 thirteen times. More specifically, the low signal level portion 71 of the control signal 68 is inverted by the inverting amplifier 74 to condition AND gate 72 to pass the sequence of high and low signal levels 60 and 65 of the binary control signal 63. The sequence of high and low signal levels 60 and 65 are coupled to the gated clock generator 76. During the four clock interval high signal level 60, the gated clock generator 76 is conditioned to pass four consecutive clock pulses received from the clock pulse generator 51. The clock pulses passed by the gated clock generator 76 are coupled to command the shift register 81 to output therefrom four of the consecutively stored binary bit signal levels forming the address signal.

The single clock interval low signal level 65 portion of the binary control signal 63 following the four clock interval high signal level 60 initiates the generation of the aforedescribed repeat bit, R. The low signal level 65 of the binary control signal 63 inhibits the gated clock generator 76 from passing a clock pulse received from the clock pulse generator 51. Hence, the signal level on the output line 82 of the shift register 81 remains at the same level as that corresponding to the binary bit of the address signal output from the shift register 81 during the last clock interval of the preceding four clock interval high signal level 60 portion of the binary control signal 63. Hence, the Manchester encoder 47 will generate a clock time transition following each fourth binary bit position of the address signal portion of the frame identifying signal 19 which is in the same direction as the fourth binary bit, hence, a repeat transition or bit, R.

To encode a complete address signal 41 of a frame identifying signal 19, the shift register 81 is commanded in the foregoing manner 52 times to output a binary bit and 13 times to repeat a binary bit. If less than 65 clock intervals of information are to be recorded in the address signal portion of the frame identifying signal 19, the unneeded portion of the frame identifying signal 19 would be set in one of the two possible binary states, for example, zero. Following the 65 clock pulse issued after the termination of the thirteen clock pulse interval high signal level 69 portion of the control signal 68, a frame pulse is received from the master frame pulse generator at the input terminal 64. This frame pulse resets the setable shift register 62, advances the BCD counter 77 to the next count corresponding to the next address signal, e.g., 19'', in the series of consecutive address signals to be recorded along the cue track 17 and resets the counter 65 to, thereby, initiate the encoding cycle for the next address signal to be recorded.

The Manchester II + 180° transition form frame identifying signals 19 output by the Manchester encoder 47 are recorded along the cue track 17 of the video tape 11 in time synchronized relation with frame pulses 43 provided by the television broadcaster's master frame pulse signal generator and recorded in the control track 16. In the illustrated embodiment, the recording of the frame pulses 43 and frame identifying signals 19 are synchronized so that the frame pulses 43 are recorded along the control track 16 at positions aligned with the positions in the cue track 17 at which the selected number flux transitions 27' of the frame boundary signal sequences 42 are recorded. As will be explained hereinbelow, this alignment of the recorded frame pulses 43 and selected number flux transitions 27' facilitate decoding of the frame identifying signals 19. In addition to synchronizing the recording of the frame pulses 43, the video tape 11 is transported at a precisely known speed during the recording operations. The video tape 11 must be transported at a precisely known speed during the recording of the frame identifying signals 19 in order to be able to reproduce and decode the signals 19 at any speed of tape transport.

Figure 5:
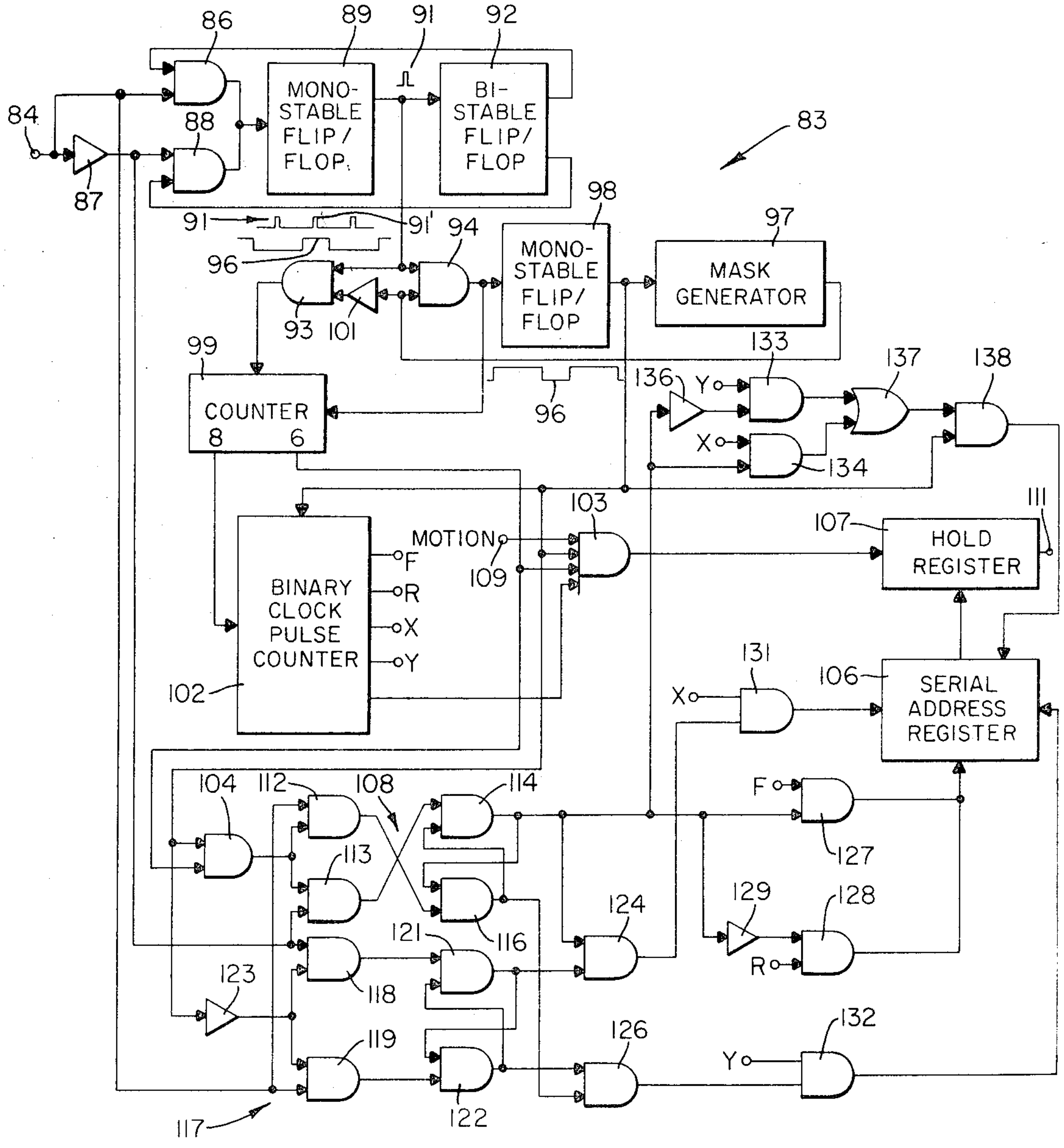
FIG. 5 is a schematic block diagram of an embodiment of a system for decoding and reproducing the frame identifying signals recovered from the magnetic video tape.

Referring to FIG. 5, a decoding means 83 is illustrated for decoding the frame identifying signals 19 recovered from the magnetic tape 11 and providing the information carried thereby regardless of the direction of tape motion and the speed at which the tape 11 is being transported. The recorded frame identifying signal flux transition sequences 19 are reproduced from the cue track 17 of the magnetic tape 11 by the record and reproduce magnetic head 21. The reproduced frame identifying signals 19 are input through a common digital reproduce amplifier (not shown) to the decoding means 83 at its input terminal 84. The input terminal 84 is directly connected to one of the inputs of a first AND gate 86 and through an inverting amplifier 87 to one of the inputs of a second AND gate 88.

The outputs of the AND gates 86 and 88 are connected together through suitable isolating means (not shown) at the input of the normally non-conducting stage of a monostable flip-flop 89. A positive going transition coupled from the input terminal 84 to the input of one of the AND gates 86 and 88 causes the AND gate receiving the positive going transition to issue a negative going signal. The negative going signal from either of the AND gates 86 or 88 causes the monostable flip-flop 89 to be switched to its quasi-stable conducting state. The circuit parameters of the monostable flip-flop 89 are arranged so that is will return to its normally stable conducting state at a time less than one-half the clock interval reproduced at the highest speed the tape 11 will be transported to, thereby, output a short positive going pulse 91.

The pulses 91 issued by the monostable flip-flop 89 are coupled to the input of a bistable flip-flop 92 to switch it from one of its stable conducting states to the other each time the negative going trailing edge of a pulse 91 is received. The output of one of the stages of the bistable flip-flop 92 is coupled to the other input of the AND gate 86. The output of the other stage of the bistable flip-flop 92 is coupled to the other input of the AND gate 88. The stages of the bistable flip-flop 92 are coupled to the inputs of the AND gates 86 and 88 so that the AND gate receiving a positive going signal change at its input from the input terminal 84 causes the conducting state of the associated stage of the bistable flip-flop 92 to change from a high signal level to a low signal level at a time immediately following the generation of the trailing edge of the pulse 91 by the monostable flip-flop 89. The one of the AND gates 86 and 88 coupled to the stage of the bistable flip-flop 92 switched to a low signal level is reset to issue a high signal level output and is inhibited from issuing the negative going signal to the monostable flip-flop 89 in response to signal level transitions occurring at the input terminal 84. However, the other stage of the bistable flip-flop 92 will be simultaneously at a high signal level. Hence, the other of the AND gates 86 and 88 will be conditioned to issue the negative going signal to the monostable flip-flop 89 in response to a signal level transitions' occurring at the input terminal 84.

The two AND gates 86 and 88, inverting amplifier 87 and monostable and bistable flip-flops 89 and 92 operate to generate a short positive going pulse 91 for each signal level transition occurring at the input terminal 84. These signal level transitions correspond to the recorded magnetic flux transitions 26 and 31 of FIG. 1. For example, assuming a positive going signal level transition occurs at input terminal 84, the AND gate 86 responds by issuing a negative going signal to the monostable flip-flop 89. As described hereinabove, the monostable flip-flop 89 responsively generates the positive going transition-related pulse 91 which causes the bistable flip-flop 92 to reset and inhibit the initiating AND gate 86 while conditioning the other AND gate 88 to be responsive to positive going signal level changes at its input. In a Manchester II + 180° self-clocking NRZ format, the sequence of flux transitions will always alternate in polarity. Therefore, the next signal level change at the input terminal 84 will be negative going. However, the inverting amplifier 87 causes the negative going signal level change to be positive going at the input to the AND gate 88. As in the case of the operation of the AND gate 86, the responding AND gate 88 causes a transition-related pulse 91 to be issued by the monostable flip-flop 89 and signal level changes in the bistable flip-flop 92 which reset and inhibit the AND gate 88 while simultaneously conditioning the AND gate 86.

From the foregoing description, it is apparent that the monostable flip-flop 89 will issue a pulse 91 for each flux transition, both information bearing transitions 26 occurring at clock time and non-information bearing transitions 31 occurring between clock times, recorded along and reproduced from the cue track 17 of the magnetic tape 11. These transition-related pulses 91 are coupled to further decoding circuitry to obtain the clock pulses, to determine the direction of tape motion and the speed at which the tape 11 is being transported during the reproducing operation, and to extract the address signal information.

The flux-transition-related pulses 91 issued by the monostable flip-flop 89 are coupled to two AND gates 93 and 94 which are operated to separate those pulses 91 generated in response to the reproduction of transitions 26 occurring at clock times from those generated in response to the reproduction of transitions 31 occurring between clock times. The AND gates 93 and 94 also received a negative going mask signal 96 provided by a mask generator 97. The mask signal 96 inhibits AND gate 94 from passing flux-transition-related pulses 91 while being coupled to condition the AND gate 93 to pass a flux-transition-related pulses 91. In the absence of the negative going mask signal 96, AND gate 94 is conditioned to pass the flux-transition-related pulse 91 while the AND gate 93 is inhibited from passing them.

The mask generator 97 functions as a variable pulse width generator and is responsive to the passage of flux-transition-related pulses 91 by AND gate 94 to provide a mask signal 96 of a width inversely proportional to the rate at which pulses 91 are passed by AND gate 94. The mask generator 97 operates to issue the mask signal 96 of a width and at a time relative to the interval between the flux-transition-related pulses 91 to coincide with the intermediate 40 percent of the interval between successive pulses 91 generated from reproduced clock time flux transitions 26. In the absence of the flux-transition-related pulses 91, the output provided by the mask generator 97 is at a high signal level. Upon the receipt of flux-transition-related pulses 91, the output of AND gate 94 causes the mask generator 97 to issue the negative going mask pulse 96. If the flux-transition-related pulses 91 initially received by the AND gate 94 are spaced at intervals corresponding to one-half the clock period, as when consecutive identical binary bits of "zero" or "one" are being reproduced from the cue track 17, the mask generator 97 will issue a mask signal 96 of a width of and a time coinciding with the intermediate forty percent of the interval between flux-transition-related pulses 91 generated from consecutively reproduced clock time flux transition 26 and intermediate non-information bearing flux transitions 31. Hence, the output of the mask generator 97 will correspond to that which is correct for a tape speed of two times the actual speed. However, each frame identifying signal 19 includes a frame boundary signal 42 having a sequence of consecutive flux transitions 26 appearing at clock rate. Hence, before the magnetic tape 11 is transported a distance of a single frame, flux-transition-related pulses 91 will appear at the input of the AND gage 94 at a rate corresponding to the clock rate and a time corresponding to clock time. These clock rate flux-transition-related pulses 91 cause the mask generator 97 to issue a mask signal 96 of proper width and at a correct time corresponding to the reproduced clock interval. Subsequent successive flux-transition-related pulses 91 appearing at twice clock rate will not affect the generation of the mask signal 96 since the pulses 91 corresponding to non-information bearing transitions 31 are prevented from being passed to the mask generator 97 by the negative going mask signal 96 present at the input of the AND gate 94. However, if the speed at which the magnetic tape 11 is transported changes, the interval between pulses 91 at the input to the AND gate 94 changes. Since the interval between clock time flux-transition-related pulses 91 changes, the pulse width of the mask signal 96 will change. Therefore, the mask generator 97 automatically seeks to provide the mask signal 96 at the proper time and rate at all possible tape speeds.

A variable pulse width generator or mask generator 97 of the aforementioned type is described in the copending United States Patent application entitled "METHOD AND APPARATUS FOR SUB PERIOD MEASUREMENT OF SUCCESSIVE VARIABLE TIME PERIODS," by Joseph W. Barkley, Jr., Ser. No. 749,142, filed July 31, 1968, now U.S. Pat. No. 3,585,502 and assigned to the assignee of this application.

The output of the AND gate 94 is coupled to the input of the normally non-conducting stage of a monostable flip-flop 98 and the clock input of a counter 99. The monostable flip-flop 98 is responsive to the positive going trailing edge of a negative going pulse issued by the AND gate 94 when a clock time flux-transition-related pulse 91 is received thereby. The trailing edge of the negative going pulse issued by the AND gate 94 causes the monostable flip-flop 98 to be switched to its quasi-stable conducting state. Like the monostable flip-flop 89, the circuit parameters of the monostable flip-flop 98 are arranged so that it will return to its normally stable conducting state at a time less than one-half the clock interval reproduced at the highest speed the tape 11 will be transported. The monostable flip-flop 98 issues a positive going pulse delayed for an interval equal to the width of the flux-transition-related pulses 91. The positive going delayed pulses from the monostable flip-flop 98 are coupled to operate the mask generator 97 and other parts of the decoding circuitry. The delay is employed in the decoding circuitry to ensure that its various active elements are conditioned to receive and decode the reproduced address signal information.

Referring to the AND gate 93, it receives an inverted mask signal 96′ from an inverting amplifier 101 connected in the line between its input and the mask generator 97. The inverted mask signal 96′ conditions the AND gate 93 to pass flux-transition-related pulses 91′ generated from reproduced non-information bearing flux transitions 31. Each time the monostable flip-flop 89 issues such a flux-transition-related pulse 91′, the AND gate 93 provides a negative going pulse which is coupled to the reset input of counter 99.

Counter 99 functions to detect the reproduction of the exclusive sequence of five alternating "ones" and "zeros" and the following selected number flux transition 27′ included in the recorded frame boundary signal sequence 42. It issues a first pulse in response to the reproduction of the selected number flux transition 27′ and a second pulse in response to the reproduction of a flux transition following a selected number of clock time transitions after the transition 27′, two in the illustrated embodiment. The counter 99 counts the pulses issued by the AND gate 94 corresponding to clock time flux-transition-related pulses 91. When its count reaches a number corresponding to the number plus two of flux transitions separating the selected number transition 27′ from a boundary sequence 29 of the frame boundary signal sequence 42, six in the illustrated embodiment, the counter 99 issues the aforementioned first pulse. Since the exclusive sequence of five alternating "ones" and "zeros" is recorded only in the frame boundary signal portion 42 of the cue track 17, counter 99 will issue the first pulse only when the selected number flux transition 27′ is reproduced. While flux transitions forming other parts of the frame identifying signals 19 are reproduced, counter 99 will receive a pulse from the AND gate 93 in response to the reproduction of an intermediate non-information bearing flux transition 31 at least every fifth flux-transition-related pulse 91, hence, prior to its accumulating a count of six. These pulses from the AND gate 93 reset the counter 99 to zero and, thereby, inhibit the generation of the first and second pulses except in those instances when the frame boundary signal sequence 42 is reproduced from the cue track 17.

The boundary sequences 29 and interjacent control information bearing sequence 28 of the frame boundary signal sequence 42 together ensure the generation of the first pulse by counter 99 in response to the reproduction of the selected number flux transition 27'. The presence of the intermediate flux transition 31 in the frame boundary signal 42 ensure that the counter 99 will be reset to zero at the beginning of the exclusive sequence of five alternating "ones" and "zeros" of the frame boundary signal 42. Thus, the reproduction of the six consecutive clock time flux transition without the reproduction of an intermediate flux transition 31 will cause the counter 99 to issue the first pulse.

The first pulse issued by the counter 99 is in response to the reproduction of the selected number flux transition 27'. Since the flux transition 27' is aligned with the recorded frame pulse 43, the first pulse issued by the counter 99 can be employed to synchronize the decoding operations with the transport of the frames of the video tape 11 past a record/reproduce magnetic head (not shown). The first or reproduced frame-related pulse is coupled to one input of each of first and second AND gates 103 and 104. AND gate 103 initiates the transfer of the decoded address signal stored in a serial address register 106 to a hold register 107. AND gate 104 responds to the reproduced frame pulse provided by counter 99 to condition a motion direction sensing means 108 to detect the sense of the signal reproduced from the selected number flux transition 27' and present at the input terminal 84. The operations of these AND gates will be described in greater detail hereinbelow.

The second pulse issued by the counter 99 is coupled to a binary clock pulse counter 102 to reset the counter 102 to a zero count and ready it to begin a 78 clock time count sequence during which certain control signals are issued thereby. The binary clock pulse counter 102 also receives from the monostable flip-flop 98 the delayed pulses corresponding to the clock time flux-transition-related pulses 91. The delayed pulses are coupled to the clock input of the counter 102 to advance its count through the seventy-eight count sequence. The 78 count sequence is initiated by the reproduction of the second clock time flux transition following the reproduction of the selected number flux transition 27'. Hence, its counting cycle is offset relative to the reproduction of a single complete frame identifying signal 19.

As the binary clock pulse counter 102 is stepped through its count sequence, several control signals are issued to control the decoding of the frame identifying signals 19 reproduced from the video tape 11. Upon the receipt of the 76 delayed pulse from the monostable flip-flop 98 following the reproduction of the second clock time flux transition following a selected number flux transition 27' or the count initiating pulse issued by counter 99 at a count of eight, the counter 102 issues a transfer control pulse which is coupled to another input of the AND gate 103. The transfer control pulse allows the AND gate 103 to issue a transfer command to the hold register 107 to initiate the transfer thereto of the decoded address signal stored in the serial address register 106.

The transfer control pulse is issued by the counter 102 in response to a delayed pulse provided by the monostable flip-flop 98 in response to the reproduction of a selected number flux transition 27'. While the count sequence of the counter 102 leading to the issuance of the transfer control pulse is initiated by the detection of the selected number flux transition 27' of one frame identifying signal, for example, 19, the transfer control pulse is issued in a time synchronized relation with the selected number flux transition 27' reproduced from the following frame identifying signal 19''. Hence, each selected number flux transition 27' initiates the transfer of the decoded address signal from the serial address register 106 to the hold register 107 which is decoded from the address signal sequence 41 recorded along the length of the cue track 17 preceding the position of the initiating selected number flux transition 27'.

In editing video tape 11, often the direction of tape transport is reversed. This may occur while the counter 102 is proceeding through its seventy-eight clock time count sequence. Since the counter 102 is not sensitive to the direction of tape motion, provision must be made to prevent the erroneous issuance of a transfer command to the hold register 107. The AND gate 103 performs this function. In addition to the transfer control pulses from counter 102 and frame-related pulses from counter 99, the AND gate 103 receives delay pulses from the monostable flip-flop 98 and a motion signal. The motion signal is input at terminal 109 and is obtained from conventional motion detecting means (not shown) associated with video tape transport mechanisms. The motion detection means is arranged to provide a signal at terminal 109 indicative of the tape 11 being transported at a speed of, for example, at least five inches per second (ips). The AND gate 103 issues the transfer command upon the receipt of delayed pulse from the monostable flip-flop 98 during the coincidence of transfer control pulse and frame-related pulse provided by the counters 102 and 99, respectively, when the motion of the tape 11 is at a speed of at least 5 ips. The issued transfer command commands the hold register 107 in conventional fashion to initiate the transfer of the decoded address signal from the serial address register 106. The decoded address signal stored in the hold register 107 can be output at its terminal 111. Hence, since a coincidence must occur between the transfer control signal issued by counter 102 and the frame pulse issued by counter 99 before a transfer command will be issued by the AND gate 103, erroneous transfer commands caused by the reversal of tape motion will not be issued.

The binary clock pulse counter 102 issues other control signals employed to decode the reproduced frame identifying signals 19. To remove signal information corresponding to the reproduced repeat flux transitions, R, forward and reverse inhibit signals are provided by the counter 102 at its output terminals X and Y. When the tape 11 is transported in the forward direction, the repeat transitions, R, appearing in the address signal 41 portions of the frame identifying signal 19 are reproduced when the count accumulated by counter 102 reaches the nineth, fourteenth, nineteenth, twenty-fourth, twenty-nineth and thirty-fourth count following the count initiating pulse issued to counter 102 by counter 99. Forward inhibit signals are provided at terminal X at each of these counts. While repeat transitions, R, are included along lengths of the cue track other than those including the frame identifying signal sequence 19, these occur outside the thirty-two bit portion of the signal sequences 19 carrying the address signal sequences 41. These other repeat transitions, R, are removed by operating the decoding means 83 to decode only the recorded information occurring during the reproduction of the flux transitions occurring in the address signal 41 portions of the frame identifying signals 19.

As the tape 11 is transported in the reverse direction, the repeat transitions, R, appearing in the address signal sequences 41 of the frame identifying signals 19 are reproduced when the count accumulated by counter 102 reaches the thirty-fifth, fortieth, forty-fifth, fiftieth, fifty-fifth and sixtieth count following the count initiating pulse issued to counter 102 by counter 99. Reverse inhibit signals are provided at terminal Y at each of these counts.

The binary clock pulse counter 102 also issues forward and reverse decode commands. While the count of counter 102 is in the range of five to thirty-seven, a forward decode command is present at terminal F of the counter 102. While the count is in the range of 33 to 65, a reverse decode command is present at terminal R of the counter 102. These decode commands are coupled to control the input of decoded address signal information to the serial address register 106. The manner in which these controls are exercised will be described in further detail hereinbelow.

Considering the operation of AND gate 104 and associated motion direction sensing means 108, the motion direction sensing means 108 includes two strobing AND gates 112 and 113 connected in conventional fashion to a pair of AND gates 114 and 116 interconnected together to form a latch circuit. Upon receiving a delayed pulse from the monostable flip-flop 98 in coincidence with the frame-related pulse issued by the counter 99, the AND gate 104 issues a pulse which is coupled to one input of each of the strobing AND gates 112 and 113. A second input of the AND gate 112 is coupled directly to the input terminal 84. A second input to the AND gate 113 is coupled to the output of the inverting amplifier 87. The one or the AND gates 112 of 113 receiving a high level signal at its second input at the time the AND gate 104 issued a pulse thereto responsively generates a pulse signal which gates its associated latch AND gate 114 or 116 to a state indicative of a related direction of tape motion. For example, if the tape is being transported in the forward direction, the second input of AND gate 113 coupled to the output of the inverting amplifier 87 receives a high signal level at the time counter 99 issues the frame-related pulse in response to the reproduction of the selected number flux transition 27'. This causes the output of the latch AND gate 114 to be set at a high level and that of the latch AND gate 116 to be set at a low level. If tape 11 is transported in the reverse direction, the second input of the AND gate 112 will receive a high level signal from the input terminal 84 at the time counter 99 issues the frame-related pulse. This causes the output of the latch AND gate 114 to be set at a low level and that of the latch AND gate 116 to be set at a high level. Hence, by monitoring the signal level of one of the latch AND gates, for example 114, it is possible to determine the direction of tape motion from the sense of the reproduced selected number flux transition 27' of the recorded frame boundary signal 42. As described hereinabove, when the tape 11 is being transported in the forward direction, the output of the latch AND gate 114 is at a high signal level. When the tape 11 is being transported in the reverse direction, the latch gate 114 provides a low level signal output.

To decode the reproduced address signal 41, the reproduced flux transition signal at the input terminal 84 is coupled to a demodulating means 117 for converting the Manchester II + 180° transition form of the reproduced address signal to a corresponding conventional binary level form. The particular Manchester II + 180° demodulating means 117 illustrated in the figures includes a pair of strobing AND gates 118 and 119 connected in the conventional manner to a second pair of AND gates 121 and 122 arranged in the form of a latch circuit. The delayed pulses 91 issued by the monostable flip-flop 98 are coupled through a level setting inverting amplifier 123 to one input of each of the strobing AND gates 118 and 119. The second input of the strobing AND gate 119 is directly coupled to the input terminal 84 and the second input of the strobing AND gate 118 is coupled to the output of the inverting amplifier 87. The strobing AND gates and latch AND gates of the demodulating means 117 function in the same manner as described hereandbefore with reference to the motion direction sensing means 108, except that the strobing AND gates are operated at the reproduced clock rate instead of only when a frame pulse is issued by counter 99. When the tape 11 is transported in the forward direction, the signal level of the latch AND gate 121 will provide the binary level form of the reproduced address signal. When transporting the tape 11 in the reverse direction, the latch AND gate 122 provides the binary level form of the reproduced address signal.

The outputs provided by each of the latch AND gates 121 and 122 of the demodulating means 117 are coupled respectively through a pair of control gates to the inputs at opposite ends of the serial address register 106. More specifically, the output provided by the latch AND gate 121 is coupled to one input of a first blocking gate 124. The second input of the blocking gate 124 is coupled to the output of the latch AND gate 114 of the motion direction sensing means 108. The output provided by the latch AND gate 122 is coupled to one input of a second blocking gate 126. The second input of the blocking gate 126 is coupled to the output of the latch AND gate 116 of the motion direction sensing means 108. When the tape 11 is transported in the forward direction, the high level signal output of the latch AND gate 114 conditions the blocking gate 124 to allow the binary level form of the address signal provided thereby to pass to one input of the serial address register 106. When the tape 11 is transported in the reverse direction, the high level signal output of the latch AND gate 116 conditions the blocking gate 126 to allow the binary level form of the address signal provided thereby to pass to the other input of the serial address register 106. The operation of the latch AND gates 114 and 116 insure that the reproduced address signals provided by the demodulating means 117 will be coupled to only one of the inputs of the serial address register 106 at any particular time.

The binary level form of the reproduced address signals passed by the blocking gates 124 and 126 include information corresponding to the reproduced repeat flux transitions, R. To remove the information corresponding to the reproduced repeat flux transitions, R, from the address signal, a first AND gate 131 is serially connected between the output of the blocking gate 124 and the input to one end of the serial address register 106. A second AND gate 132 is serially connected between the blocking gate 126 and the other input of the serial address register 106. The forward and reverse inhibit signals provided by the clock pulse counter 102 at terminals X and Y are employed to prevent the binary level signal information corresponding to reproduced repeat flux transitions from being coupled to the serial address register 106. The forward inhibit signals at terminal X of the counter 102 are coupled to a second input of the AND gate 131. Each time a repeat transition, R, is reproduced, the counter issues a low level inhibit signal to the AND gate 131. This decouples the demodulating means 117 from the serial address register 106, thereby, preventing the input of the reproduced repeat transition information into the register 106. The reverse inhibit signals provided by counter 102 at its terminal Y are similarly coupled to a second input of the AND gate 132. These reverse inhibit signals decouple the demodulating means 117 from the serial address register 106 to prevent the input of the reproduced repeat transition information into the register 106. The demodulating means 117 remains decoupled from the serial address register 106 until a reproduced clock time flux transition following the reproduced repeat transition binary bit is present at the input terminal 84 of the decoding means 83.

To clock in the binary level form of the address signal to the serial address register 106, the delayed pulses provided by the monostable flip-flop 98 are coupled through control logic to the stepping input of the serial address register 106. Since the binary level signal information at the outputs of the latch AND gates 121 and 122 include binary bits corresponding to the reproduced repeat flux transitions, R, provision must be made to prevent the stepping of the serial address register during the binary bit interval of the repeat transition portion of the decoded address signal. Furthermore, in the particular embodiment described, the length of the cue track 17 allotted for recording an address signal 41 is longer than the interval required to record it. Hence, when reproducing the address signal 41 while the tape 11 is being transported in the forward direction, the flux transitions carrying the address signal 41 will be reproduced immediately following the reproduction of the frame boundary signal 42. On the other hand, when transporting the tape 11 in the reverse direction, the flux transitions carrying the address signal 41 will be reproduced at an interval following the reproduction of the frame boundary signal 42. In the illustrated embodiment, this interval is 38 clock periods. Therefore, provisions must be made for insuring that the serial address register 106 receives the binary level information provided by the latch AND gates 121 and 122 when it corresponds to the reproduction of the flux transitions during the address signal interval of the cue track 17 regardless of the direction of tape motion.

To insure that the binary level signal information provided by the demodulating means 117 is input to the serial address register 106 at a time corresponding to the beginning the reproduction of the address signal 41, AND gates 127 and 128 are coupled to provide enabling commands to the serial address register 106. These commands enable the serial address register 106 to receive binary level information from the demodulating means 117. The AND gate 127 is connected to the clock pulse counter 102 at terminal F to receive a high signal level forward decode command generated thereat upon the receipt of the fifth delayed pulse from the monostable flip-flop 98 following the count initiating pulse issued by counter 99. This forward high signal level command continues through the thirty-seventh delayed pulse following the count initiating pulse. The AND gate 128 is coupled to the clock pulse counter 102 at terminal R to receive a high signal level reverse decode command generated thereat upon the receipt of the thirty-third delayed pulse provided by monostable flip-flop 98 following the initiating pulse provided by counter 99. This reverse high signal level command continues through the sixty-fifth delayed pulse following the count iniating pulse.

When the tape 11 is being transported in the forward direction, the high signal level at the output of the AND date 114 conditions the AND gate 127 to issue the enabling command to the serial address register 106 upon receiving the forward decode command from the counter 102. When the tape 11 is being transported in the reverse direction, the output provided by the AND gate 114 at a level which inhibits AND gate 127 while, through the operation of the inverting amplifier 129, conditions AND gate 128 to issue the enabling command to the serial address register 106 upon receiving the reverse decode command from the counter 102.

The decoded binary level form address signal provided by the demodulating means 117 is stepped into the serial address register 106 by delayed clock time pulses provided by the monostable flip-flop 98. To prevent stepping of the serial address register 106 during the binary bit interval of the repeat transition portion of the decoded address signal, AND gates 133 and 134 are provided. While tape 11 is being transported in the forward direction, AND gate 134 is conditioned by the high signal level at the output of the AND gate 114 to pass the inhibit signals provided by the clock pulse counter 102 at terminal X. The AND gate 133 is conditioned by the signal level provided by the AND gate 114 through the inverting amplifier 136 to pass the inhibit signals provided by the clock pulse counter 102 at terminal Y while the tape 11 is being transported in the reverse direction. The output of the AND gates 133 and 134 are coupled to the inputs of an OR gate 137 which issues a pulse each time an inhibit signal is generated by one of the AND gates. An AND gate 138 has one input coupled to receive the pulses issued by the OR gate 137 and a second input to receive the delayed pulse from the monostable flip-flop 98. The AND gate 138 is arranged to issue a pulse for each delayed pulse received thereby as long as the OR gate 137 does not issue a pulse. These pulses are coupled to clock in the decoded binary level address signals to the serial address register 106.

The decoded address signals stored in the serial address register 106 are transferred to the hold register 107 in response to the transfer command issued by the AND gate 103. The decoded address signals can be monitored or output from the hold register 107 at its output terminal 111. Since the frames of the video tape 11 are consecutively addressed, it is possible to determine instantaneously the number of frames separating a particular frame whose address signal is stored in the hold register 107 from any of its other frames by comparing the stored address signal with the address signal of the other frame.

I claim:

1. Apparatus for alternately encoding blocks of binary control information and blocks of binary data information in a self-clocking non-return-to-zero format for sequentially recording the blocks of control and data information respectively along alternate first and second lengths of a track of a magnetic record medium wherein information is recorded as sequences of magnetic flux transitions between different magnetic states occurring at discrete intervals; each of the blocks of control information recorded along said first length of the track as a selected sequence of magnetic flux transitions; the selected sequence of magnetic flux transitions recorded exclusively in said first lengths of the track; said encoding apparatus comprising; means for generating a sequence of binary bits occurring at discrete intervals corresponding to the selected sequence of magnetic flux transitions forming a block of binary control information at a rate equal to the rate at which the blocks of binary control information are to be recorded along the track of the magnetic record medium; each of said control block sequences of binary bits including contiguous first and second sequences of binary bits, said first sequence of a selected number of binary bits and occurring at the beginning and ending boundaries of the binary bit control sequence, said second sequence of a selected number of binary bits and interjacent said first sequences, each of said second sequences including two first sub-sequences of a selected number of binary bits one contiguous with each of said first sequences and a second sub-sequence of a selected number of binary bits contiguous with the end of each first sub-sequence, each of said second sequences including an exclusive sequence of flux transitions occurring therein; means for generating blocks of data information each as a sequence of binary bits without generating the exclusive sequence included in the second sequences of the control block sequence; a self-clocking NRZ encoder for converting the control block and data block sequences of binary bits to a self-clocking NRZ signal format wherein the binary bit information is represented by transitions between different signal levels at discrete intervals; switching means for alternately coupling the control block sequence of binary bits and the data block sequence of binary bits to the input of the self-clocking NRZ encoder; and a clock generator providing a timing signal for synchronizing the operations of the control block sequence generator, data information binary bit generator, self-clocking NRZ encoder and switching means to provide the sequence of alternating data and control block sequences.

2. The apparatus according to claim 1 wherein said data information binary bit generator includes a stepable binary counter storing at one time one binary number of a sequence of consecutive binary numbers, command means responsive to the generation of each control block sequence of binary bits to issue a command signal, said stepable binary counter responsive to said command means to output the stored binary number for coupling to the encoder upon the issuance of said command signal, and said stepable binary counter is advanced one binary number after outputting each stored binary number.

3. The apparatus to claim 2 further comprising means in circuit connection with said stepable binary counter to command it to output binary bits occurring at regular intervals of each binary number twice in succession, the interval between the successively output binary bit is less than the interval of the exclusive sequence included in the second sequence of selected number of binary bits.

4. The apparatus according to claim 1 wherein said control block sequence generator provides a sequence of odd number of binary bits symmetrical about a binary bit at the center of the odd number of binary bits.

5. Apparatus for decoding binary information recorded in a self-clocking NRZ format along a track of a magnetic record medium wherein information is recorded as sequences of magnetic flux transitions at discrete intervals between different magnetic states, said information including blocks of binary control information and binary data information sequentially recorded respectively along alternate first and second lengths of said track, the sequence of magnetic flux transitions forming the binary control information being identical and recorded only along said first lengths of the track, each identical sequence of magnetic flux transitions forming the blocks of binary control information including contiguous first and second sequences of magnetic flux transitions, said first sequence occurring for a selected number of intervals along a boundary segment at each end of each of said first lengths of said track, said second sequence occurring for a selected number of intervals along an interjacent segment between said boundary segments of each of said first lengths, each of said second sequences including a first subsequence of reproducible magnetic flux transitions extending from each first sequence for a selected number of intervals towards the other first sequence and a second sub-sequence of reproducible magnetic flux transitions contiguous with the end of each first sub-sequence and extending from said end for a selected number of intervals, said second sequence including an exclusive sequence of flux transitions therein; said decoding apparatus comprising; means for reproducing the recorded sequences of control and data information magnetic flux transitions to provide signals representative of the transitions recorded along the track; means responsive to said first sequences of reproduced magnetic flux transitions to provide first signal commands; means responsive to said exclusive sequences of reproduced magnetic flux transitions to to provide second signal commands; means for sensing the direction of motion of the recording medium coupled to receive said first and second signal commands and the sequences of reproduced magnetic flux transitions; said motion direction sensing means responsive to said first and second signal commands to issue a motion direction signal according to the reproduced second subsequence of magnetic flux transitions; means responsive to the sequences of reproduced control information magnetic flux transitions to provide a timing signal corresponding to the speed at which the recording medium is being transported; and decoding means coupled to receive the sequences of reproduced magnetic flux transitions and responsive to the motion direction signal and timing signal to decode the reproduced data information.

6. The decoding apparatus according to claim 5 wherein each block of binary data information is recorded in a self-clocking NRZ format along spaced segments of the second lengths of the track of the magnetic record medium as a sequence of magnetic flux transitions at discrete intervals, each of said segments of said second lengths of a length equal to a number of intervals less than the number of intervals of the exclusive magnetic flux transition sequence along each of said first lengths, said segments of said second lengths spaced from each other a length of at least one interval, the space between each of the segments of each second length having a magnetic flux transition condition representative of the same binary digit represented in the adjacent interval of the preceding segment, and the decoding apparatus further comprising means responsive to the reproduction of the magnetic flux transitions of the blocks of control information to command the decoding means to remove signals representative of magnetic flux transition reproduced from the spaces between the segments from the signals representative of magnetic flux transition reproduced from the segments of the second lengths.

7. A magnetic record medium having a track of alternating first and second lengths, each of said first lengths including a boundary segment at each of its ends and an interjacent segment, each of said first lengths having thereon contiguous first and second sequences of reproducible magnetic flux transitions between first and second magnetic states representative of binary digits occurring at discrete intervals, said first sequence occurring along each boundary segment for a selected number of intervals, said second sequence occurring along each interjacent segment for a selected number of intervals, each of said second sequences including a first sub-sequence of reproducible magnetic flux transitions extending from each first sequence for a selected number of intervals towards the other first sequence and a second sub-sequence of reproducible magnetic transitions contiguous with the end of each first sub-sequence and extending from said end for a selected number of intervals, each of said second sequences including an exclusive sequence of magnetic flux transitions occurring only along the interjacent segment of said first length.

8. The magnetic record medium according to claim 7 wherein the second magnetic flux transition sequence is symmetrical about one second magnetic flux transition sub-sequence, and the first magnetic flux transition sub-sequence extending from each first magnetic flux transition sequence is contiguous with the said one second sub-sequence.

9. The magnetic record medium according to claim 8 wherein a magnetic flux transition from the first magnetic state to the second magnetic state at an interval represents one of the binary digits and a magnetic flux transition from said second magnetic state to said first magnetic state at an interval represents the other of the binary digits, and the one second magnetic flux transition sub-sequence in each of the first lengths is a single magnetic flux transition from the same one of the two magnetic states to the other of the two magnetic states occurring within one interval of both ends of the first magnetic flux transition sub-sequences.

10. The magnetic record medium according to claim 8 wherein each first magnetic flux transition sub-sequence and the contiguous one second magnetic flux transition sub-sequence forms one exclusive sequence of magnetic flux transitions included in the second magnetic flux transition sequence.

11. The magnetic record medium according to claim 7 wherein each of the second magnetic flux transition sub-sequences in the first lengths is a single magnetic flux transition from the same one of the two magnetic states to the other of the two magnetic states occurring within one interval of the end of the first magnetic flux transition sub-sequence.

12. The magnetic record medium according to claim 11 wherein a magnetic flux transition from the first magnetic state to the second magnetic state at an interval represents one of the binary digits and a magnetic flux transition from said second magnetic state to said first magnetic state at an interval represents the other of the binary digits.

13. The magnetic record medium according to claim 7 further having a series of reproducible magnetic flux transitions between first and second magnetic states along the second lengths of said magnetic record medium representative of data information binary digits occurring at discrete intervals, each of said second lengths including spaced segments each of a length equal to a number of intervals less than the number of intervals of the exclusive magnetic flux transition sequence along each of said first lengths, said segments of said second lengths spaced from each other a length of at least one interval, said digital data information magnetic flux transitions occurring in said second lengths only along said spaced segments, and the space between each of the segments of each second length having a magnetic flux transition condition representative of the same binary digit represented in the adjacent interval of the preceding segment.

14. The magnetic record medium according to claim 13 wherein a magnetic flux transition from the first magnetic state to the second magnetic state at an interval represents one of the binary digits and a magnetic flux transition from said second magnetic state to said first magnetic state at an interval represents the other of the binary digits, and the spaces between the segments of each second length having magnetic flux transitions at the intervals from the same one of the two magnetic states to the other of the two magnetic states as the magnetic flux transition in their respective adjacent intervals of their respective preceding segments.

15. The magnetic record medium according to claim 14 wherein each of the spaces between the segments of the second length is of a length equal to one interval, and each of said spaces has a magnetic flux transition at the interval from the same one of the two magnetic states to the other of the two magnetic states as the magnetic flux transition in the adjacent interval of the preceding segment.

16. The magnetic record medium according to claim 13 further having a second track for recording signal information at separate locations therealong, the second lengths of the track of alternating first and second lengths aligned along the magnetic record medium relative to said separate locations of said second track to have the second magnetic flux transition sub-sequences along the interjacent segments of the first length aligned relative to the boundaries between adjacent separate locations along said second track, and the series of magnetic flux transitions in the spaced segments of each of said second lengths representative of address information identifying a location for recording signal information along said second track.

* * * * *

PO-1050
(5/69)

UNITED STATES PATENT OFFICE
CERTIFICATE OF CORRECTION

Patent No. 3,739,086 Dated June 12, 1973

Inventor(s) JOHN T. HEATHER

It is certified that error appears in the above-identified patent and that said Letters Patent are hereby corrected as shown below:

IN THE ABSTRACT

Line 7, after "block" insert --of--.

Line 9, after "block" insert --of--.

IN THE SPECIFICATION

Column 2, line 32, delete "as" in the second occurrence.

Column 4, line 20, change "it's" to --its--.

Column 5, line 24, after "formation" insert --. It--.

line 25, change "are" to --is--.

Column 8, line 7, after "bits" insert --or digits--.

line 21, change "portions" to --sequences--.

line 26, delete "reproducing".

line 59, delete "occurs".

line 66, change "portion" to --sequence--.

line 66, change "of" to --recorded along--.

Column 10, lines 59 - 60, change "proceeding" to --preceding--.

Column 11, line 14, after "signals" insert --sequence--.

line 14, delete "onto".

PO-1050
(5/69)

UNITED STATES PATENT OFFICE
CERTIFICATE OF CORRECTION

Patent No. 3,739,086 Dated June 12, 1973

Inventor(s) JOHN T. HEATHER

It is certified that error appears in the above-identified patent and that said Letters Patent are hereby corrected as shown below:

Continued from page one...

Column 11, line 27, delete "onto".
line 29, after "signal" insert --sequence--.

Column 12, line 2, change "signal" to --signals--.
line 5, change "signal" to --signals--.

Column 14, line 58, after "65" insert --th--.

Column 15, line 52, change "is" to --it--.

Column 16, line 17, change "transitions'" to --transitions--.

Column 17, line 2, change "pulses" to --pulse--.

Column 19, line 55, after "76" insert --th--.

Column 20, line 61, change "nineth" to --ninth--.
line 62, change "twenty-nineth" to --twenty-ninth--.

Column 21, line 7, after "signal" insert --sequences--.
line 7, delete "portions".
line 42, change "or" to --of--.
line 43, change "of" to --or--.

PO-1050
(5/69)

UNITED STATES PATENT OFFICE
CERTIFICATE OF CORRECTION

Patent No. 3,739,086 Dated June 12, 1973

Inventor(s) JOHN T. HEATHER

It is certified that error appears in the above-identified patent and that said Letters Patent are hereby corrected as shown below:

Continued from page two...

Column 22, line 24, change "hereandbefore" to --hereinbefore--.

Column 23, line 62, after "beginning" insert --of--.

Column 24, line 18, change "date" to --gate--.

IN THE CLAIMS

Column 26, line 45, delete "to" in the second occurrence.

line 47, change "recording" to --record--.

line 56, change "recording" to --record--.

Signed and sealed this 14th day of May 1974.

(SEAL)
Attest:

EDWARD M.FLETCHER,JR.
Attesting Officer

C. MARSHALL DANN
Commissioner of Patents